United States Patent

[11] 3,603,647

| [72] | Inventors | Shimon Arieh<br>Geneva;<br>Georges Revillet, Petit-Lancy/Geneva, both of, Switzerland |
|---|---|---|
| [21] | Appl. No. | 820,360 |
| [22] | Filed | Apr. 30, 1969 |
| [45] | Patented | Sept. 7, 1971 |
| [73] | Assignee | Battelle Memorial Institute<br>Geneva, Switzerland |
| [32] | Priority | May 2, 1968, July 3, 1968 |
| [33] | | Switzerland |
| [31] | | 6621/68 and 9923/68 |

[54] PRESSURE-RESPONSIVE AIR DISCHARGE DEVICES
9 Claims, 6 Drawing Figs.

[52] U.S. Cl. ............................................. 302/29
[51] Int. Cl. ............................................. B65g 53/04
[50] Field of Search ............................................. 302/17, 29, 31

[56] References Cited
UNITED STATES PATENTS

| 2,785,928 | 3/1957 | Hanson | 302/29 |
| 3,190,460 | 6/1965 | Rubin | 302/29 |
| 3,266,848 | 8/1966 | Pitkanen | 302/29 |
| 3,279,863 | 10/1966 | Bouladon et al. | 302/29 |
| 3,414,331 | 12/1968 | Fogg | 302/29 |

*Primary Examiner*—Andres H. Nielsen
*Attorney*—Waters, Roditi, Schwartz & Nissen ABSTRACT: A device for forming, in conjunction with similar devices, a layer of air on a surface to provide support for an object, comprises a casing divided by a flexible, tensioned, membrane into two compartments communicating respectively with a supply of compressed air and a discharge opening. The membrane, which lies near this opening, is normally deformed into contact therewith to close it off but will move away therefrom upon a fluid pressure being exerted on the membrane from the opening side to allow compressed air to flow through the opening via ports formed near the periphery of the membrane.

PRESSURE-RESPONSIVE AIR DISCHARGE DEVICES

This invention relates to a device for forming a layer of gaseous fluid on a surface to provide support for an object.

There have been proposed numerous transporters which comprise a surface for conveying the objects to be transported through the intermediary a supporting layer of air. Generally, such a layer is formed by allowing compressed air to escape through openings terminating in said conveying surface. Whereas in some of these transporters the escape of air is designed to be permanent, thus incurring on the whole a loss of energy out of all proportion with the number of objects being transported or with their weight, it has also been proposed to control the rate at which the air issues from the discharge openings by means of automatic valves adapted to interrupt the flow of air as soon as the object or objects being transported cease to be within the ambit of the corresponding discharge opening.

According to one such valve, a ball is mounted for axial movement in a housing which is supplied at the bottom thereof with air under pressure, the ball being raised by this fluid to a position in which it closes an opening at the top of the housing whenever the pressure of the air exerts on the ball a thrust which is greater than the ball's own weight.

According to another such valve, the closure member consists of an elastic membrane formed with openings enabling the fluid to flow from the upstream side to the downstream side to the membrane as long as the flow takes place at a normal, set, speed to which the membrane remains unresponsive, whereas the membrane becomes deformed to a closure position under the action of the pressure to which it is subjected on its upstream side when the flow speed increases by a given amount.

According to a further such valve, which is a combination of the above two, a ball, movably mounted in a housing, is prevented from moving towards an annular seat by means of an intermediate sleevelike member slidably mounted between the valve discharge opening and the seat, said sleevelike member being supported in the chamber defined by the housing by a membrane which divides the chamber into two compartments, the first communicating with the discharge opening of the valve and the other communicating with the atmosphere. The end of the sleevelike member lying opposite the valve outlet opening forms a Venturi nozzle so that upon the flow of fluid in the sleevelike member becoming too violent, the first compartment of the chamber becomes subjected to a depression which lifts the membrane, and hence the sleevelike member, by an amount such as to enable the ball to be seated, thereby closing off the valve.

In the latter two kinds of valve, the speed of response to closure is dependent on three factors: the elasticity of the membrane, its area and the difference in pressures on the opposite sides thereof.

For a given constituent material, the elastic properties of the membrane depend solely on the thickness thereof, which thickness must of course be sufficient for the membrane to be able to offer good mechanical resistance when the valve is closed and when its upstream side is subjected to a substantial pressure.

It is thus mainly the area of the membrane surface that can be acted upon to obtain a particular speed of response, for a predetermined maximum depression.

Values of the above kinds thus only have, for a given size, a limited speed of response.

Now when such valves are used to feed compressed air to a track for conveying goods by a pneumatic floating action, it is required of the valves, in order to limit the power needed for operating the air compressors, that they may have a practically instantaneous closing action as soon as the object being supported has moved out of the ambit of each valve.

An object of the present invention is to provide a device of the kind set forth which is of simple construction, which can easily be serviced and which above all has a speed of response to closure which is particularly high.

The device provided according to the invention comprises a casing defining a chamber, said casing having an inlet opening for connection to a source of said fluid under pressure and a fluid discharge opening arranged to communicate with said surface, and further comprises an elastic membrane which is stretched across said chamber before said discharge opening, which is fluidtightly mounted at its edge and which is formed remote from said discharge opening with fluid throughflow ports, said membrane being elastically deformable whereby it may be caused to come into close contact with at least the casing portion surrounding the discharge opening thereby to close the latter when there occurs a pressure differential of particular value on opposite sides of the membrane, the membrane having means providing a fluid leakage through the membrane, in the portion thereof lying opposite the discharge opening of said casing and wherein the distance between the membrane and at least the casing portion extending from the ports to the discharge opening and/or the distance between the ports and the discharge opening is or are so chosen that fluid flow from the ports to the discharge opening takes place at a speed sufficiently high for the membrane, under the effect of a dynamic depression set up on the downstream side thereof, to be deformed into occupying a discharge opening closure position when the pressure differential on opposite sides thereof is less than said particular value by an amount at most equal to said dynamic depression.

Figure 1:
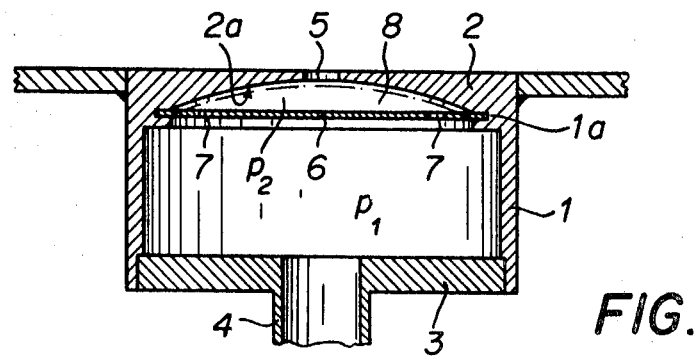
FIG. 1 is a vertical cross section through a first embodiment of a device according to the invention.
Figure 2:
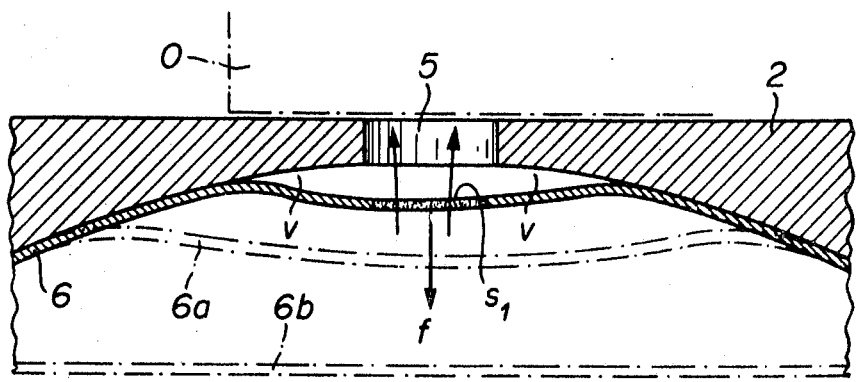
FIG. 2 shows part of FIG. 1 on a larger scale.

The device shown in FIGS. 1 and 2 comprises a cylindrical casing 1 closed off at the top by a wall 2 and at the bottom by a partition 3 solid with a duct 4 adapted to be connected to a source (not shown) of air under pressure which is to be discharged over wall 2 through a central opening 5 formed in the latter.

In the present embodiment, the topside of wall 2 is flush with and forms part of a track for conveying objects by a pneumatic floating action achieved by building up an underlying air cushion on the track.

The rate at which the air is discharged is controlled in this device by a membrane 6 whose peripheral edge portion is anchored in an annular groove $1a$ formed in the sidewall of casing 1 along the edge of the underside $2a$ of wall 2, which underside is preferably made concave for reasons given further on.

Membrane 6, made of flexible and elastic material, is formed near its outer edge with ports 7 through which air, fed in through duct 4 at a constant pressure $p_1$ into casing 1, flows upwardly and then radially inwardly towards opening 5 through the space 8 defined by wall 2 and membrane 6.

In the construction in FIGS. 1 and 2 the distance between the ports 7 and the opening 5 is large in relation to the size of opening 5 so that the annular cross section of the passage for the air flowing towards opening 5 rapidly decreases upon moving away from a port 7 and nearer opening 5.

It thus follows that the speed at which the air flows in space 8 is particularly large and is considerably greater than beneath the membrane, where pressure $p_1$ prevails.

As is known any surface over which a fluid flows is subject to a depression i.e. pressure reduction of a dynamic nature whose intensity is given by Bernouilli's relationship according to which $$\Delta p = \gamma/2g \cdot V^2$$

wherein
Δp = dynamic depression
V = speed of fluid flow
γ = specific weight of the fluid
g = gravitational acceleration Thus, if the speed of fluid flow is $V_1$ beneath membrane 6 and $V_2$ in space 8 (means value), the mean depression caused on the upper surface of membrane 6 will be:

$$\Delta p = \gamma/2g \; (V_2{}^2 - V_1{}^2).$$

Now if the membrane 6 has a rigidity such that it remains substantially horizontal, i.e. in the illustrated position, when the upstream and downstream pressures are in equilibrium and if F is the restoring force it is able to generate elastically upon being deformed to the position shown in chain-dotted lines in FIG. 1, it follows that such deformation will take place whenever $$p_1 \cdot S \geq p_2 \cdot S + F - \Delta \cdot S$$

wherein
S = area of the membrane
$p_1$ = static pressure upstream of the membrane
$p_2$ = static pressure downstream of the membrane
$\Delta p$ = dynamic depression = $\gamma/2g \cdot (V_2{}^2 - V_1{}^2)$.

Thus the membrane will be deformed into occupying a position in which it closes off opening 5 when:

$$\Delta p \geq F/S - (p_1 - p_2).$$

Values F and S are constants, $p_2$ is equal to atmospheric pressure in the illustrated case and $p_1$ is the air supply pressure.

If pressure $p_1$ is so chosen as to be insufficient to cause by itself deformation of the membrane, i.e. if $$p_1 < F/S + p_2,$$

such deformation can only occur when the speed $V_2$ has a value at least equal to $$V_2 = \sqrt{V_1{}^2 + \frac{2g}{\gamma}\left(\frac{F}{S} + p_2 - p_1\right)}$$

(neglecting the various pressure losses that take place).

To achieve this speed $V_2$, it is possible to vary the distance between the ports 7 in the membrane and the opening 5 in wall 2, for a given spacing between the membrane and the wall, or to vary this spacing for example in such a way that the airflow passage progressively decreases towards the opening 5, or of course to effect both of these variations at the same time.

In its closing off position, membrane 6 is applied over its entire area against the concave surface 2a of wall 2 in such a way that the mechanical stresses to which the membrane is subjected are practically constant throughout.

Membrane 6 will remain in its closing off position if $$p_1 \cdot S > F$$

neglecting the action of pressure $p_2$ on the portion of the membrane surface that lies opposite the opening 5), i.e. if the action of pressure $p_1$ on the membrane is greater than the elastic restoring force generated by the membrane itself.

Under these conditions, the device would, once closed, remain so even when an object comes to lie over the opening 5: as described, it is just then that the illustrated device should enable compressed air to flow therethrough to build up a supporting cushion of air for the object.

To achieve this, one or more micropassages are formed in the portion of the membrane facing the opening 5; this portion could for instance be made porous in any suitable manner. Accordingly, the opening 5 would never be fully closed off by the membrane 6 and a slight air leakage would permanently exist from the upstream side of membrane 6 to its downstream side towards the opening 5.

Thus, when an object O (FIG. 2) comes to lie over this opening, there is formed between the object and the membrane 6, in the closing off position of the latter, a small chamber in which the pressure progressively increases as compressed air passes through the micropassages in the central portion of the membrane, until it reaches, after a certain length of time, dependent on the size of the micropassages in the membrane and/or their number, a value identical to that of the pressure upstream of the membrane.

When the membrane surface $s_1$ opposite the opening 5 becomes subjected to two static pressures of equal intensity, the central portion of the membrane is then solely subjected to the elastic restoring force $f$ generated by the membrane tending to urge the latter into taking up a substantially horizontal equilibrium position. But in tending to move to this position, the membrane causes a vacuum v (FIG. 2) to be set up along the topside edges of its central portion. However, this vacuum v comes to be filled with air at pressure $p_1$ permeating through the porous central portion of the membrane 6 thus allowing the latter to move a little further from the concave surface 2a of wall 2 take up the position 6a indicated in chain-dotted lines. This further increases the area of the released membrane that is subjected on its top surface to pressure $p_1$. Since the area of this released top surface becomes larger and larger, the speed at which membrane 6 moves away from surface 2a increases rapidly until membrane 6 reaches its horizontal rest position, indicated in chain-dotted lines at 6b in FIG. 2.

This speed is of course all the greater when the elasticity of the membrane 6 is low and particularly when the speed at which air can flow through the micropassages in the central portion of the membrane is high.

Figure 3:
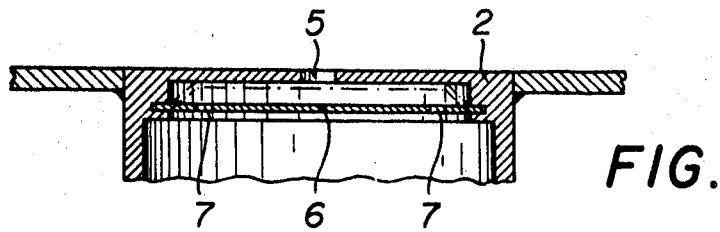
FIG. 3 is a view similar to that of FIG. 1 showing a modified constructional detail.

As shown in FIG. 3 the underside of wall 2 can be plane with membrane 6 lying at a small distance therefrom and in parallel relationship therewith. In such a case, the air throughflow ports 7 are located at such a distance from the peripheral anchored portion of the membrane that when the latter is deformed to its closure position the edges of the parts come into fluidtight engagement with the inner surface of wall 2. The membrane 6 of course then remains in this applied position as long as there is no object closing off opening 5. The central portion of membrane 6 is here also formed with micropassages, e.g. pores, to enable air permanently to leak through this portion towards opening 5.

It will however be appreciated that when the described devices, whether in relation to FIGS. 1 and 2 or in relation to FIG. 3, are associated with other similar devices and are intended to set up a layer of gaseous fluid on the surface of an object conveying track it is not essential for their membranes to be provided at their center with micropassages when there is a sufficient number of such devices opening in said track, i.e. when the size of the objects being conveyed is such that they straddle the distance separating the discharge openings of two adjacent devices since, under those conditions, it is the layer of air supporting such an object and which has been set up by adjacent devices that causes a closed device to open, as it is then the pressure of the air in the layer, equal to pressure $p_1$, which is applied through the opening 5 of the device to the upper surface of membrane 6.

Figure 4:
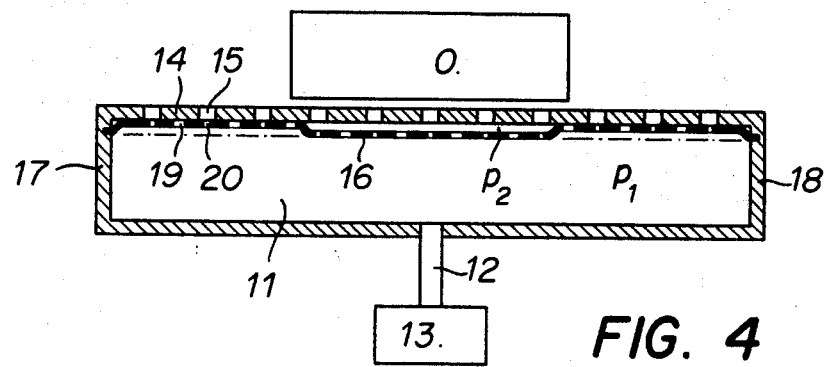
FIG. 4 is a vertical cross section through a second embodiment of a device according to the invention.

According to the second embodiment, illustrated in FIG. 4, the device comprises a chamber 11 which is connected by a duct 12 to a source 13 of air under pressure. The top wall, 14, of this chamber provides the surface on which a supporting air layer is to be formed, the air therefor being discharged through a plurality of openings 15 formed in wall 14. Within chamber 11 and opposite wall 14 is provided an elastic membrane 16 which is fluidtightly secured by its edge portions to the sidewalls 17 and 18 of the chamber and which is stretched in parallel relationship to wall 14 at a short distance therefrom.

Membrane 16 is formed with a plurality of ports 19 which lie between the openings 15 in wall 14 and with a plurality of perforations 20 which are formed opposite openings 15 and which have a particularly small cross section less than that of the ports 19. These perforations ensure that the membrane 16 is released from wall 14 when an object O comes to lie over the associated openings 15, in the same way as has been described in relation to the devices illustrated in FIGS. 1 to 3.

As explained earlier, such release takes place whenever the pressure acting on the portion of the membrane lying opposite an opening 15 becomes substantially equal to the pressure $p_1$ prevailing in chamber 11. However, by virtue of the particular form of construction adopted for the present embodiment, it is not enough for only one opening 15 to be overlaid by an object O to bring about the release of the membrane over its entire area. Here in fact such release will only take place locally, i.e. over that portion of the membrane which is directly acted upon by the object being supported.

From the above, it will be apparent that the FIG. 4 device only allows supporting air to be discharged through those openings 15 which open in the part of the upper surface of wall 14 that is overlaid by the object O being supported and that such discharge of air through the openings 15 will automatically be interrupted when they cease to be covered by object O, object O having moved. In this latter connection, because the pressure $p_1$ of the air contained in chamber 11 is greater than atmospheric, there occurs a particularly violent flow of air towards the openings 15 which have come to be uncovered, which air passes through the ports 19 that are adjacent these openings. Consequently, the portions of the membrane that are contacted by this rapid flow of air are subjected to a strong dynamic depression (application of Bernouilli's law) and these membrane portions come to adhere to wall 14 and close off the above uncovered openings 15.

Figure 5:
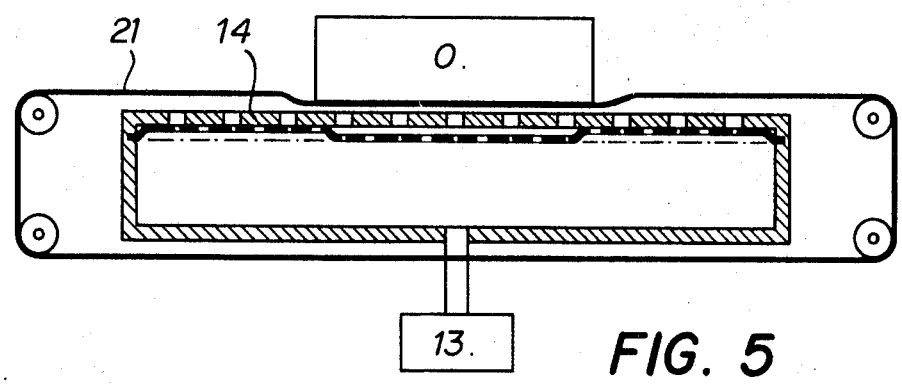
FIG. 5 is a similar view showing a modified constructional form of the second embodiment.

The constructional form shown in FIG. 5 differs from the FIG. 4 construction only in that a thin, flexible and endless carrier belt 21 passes over the outside surface of wall 14 at a short distance therefrom to enable loads, in particular loose goods, to be moved in a given direction. As is apparent from FIG. 5, an air cushion builds up beneath belt 21 where the latter becomes deformed under the weight of load O, thereby avoiding frictional contact with wall 14. With the FIG. 5 arrangement, heavy and localized loads can be supported and be readily transported at high speed with a minimum of energy consumption. Moreover, since the air required to form the air layer is only discharged through those openings in wall 14 in that are covered by load O, carrier belt 21 is not stressed by the air in the portions that are unused and does not therefore tend to bulge outwardly.

Figure 6:
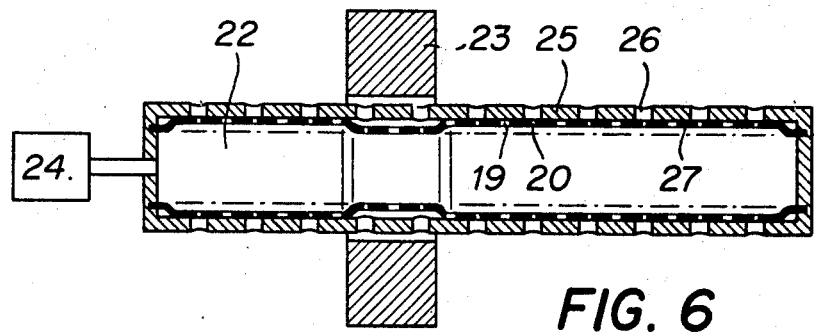
FIG. 6 is a vertical cross section through a third embodiment of a device according to the invention.

In the FIG. 6 embodiment, the supporting device there shown acts as an air cushion bearing and comprises a hollow cylindrical casing 22 on which is mounted a rotary ring 23 axially movable along the corelike casing 22. The interior of casing 22 is supplied with air under pressure from a source 24 and its circumferential wall 25 is formed with a plurality of radial openings 26 distributed over the entire area thereof. An elastic membrane 27 of tubular shape is stretched between the two ends of casing 22 in coaxial relationship therewith and slightly set back from the inner surface of wall 25. Membrane 27 is formed with a plurality of ports 19 that are offset in relation to openings 26 and with a plurality of perforations 20 that are disposed opposite the latter.

This constructional arrangement operates in the same way as the FIG. 4 construction. In the region of annulus 23, the pressures exerted on the opposite, upstream and downstream, sides of the membrane are in substantial equilibrium so that the elastic restoring force exerted by the membrane causes the latter to move away from wall 25 thus allowing air under pressure to escape from inside the casing 22 through the openings 26 that are masked by the annulus thereby to form an air cushion supporting the annulus.

This air cushion bearing thus enables both relative rotation and relative axial displacement without there being any mechanical friction between the annulus 23 and the wall 25; annulus 23 is moreover kept centered in relation to the bearing.

With the constructional arrangements described with reference to FIGS. 4 to 6, it is also possible to dispense with the micropassages which are formed by the perforations 20 and which are provided to enable the membrane to become detached from the wall 14 and to move to its spaced position in relation to the latter. To achieve this, it suffices that the distance between the various openings 15 be less than a certain value in relation to the size of the objects having to be conveyed in order that the film of air set up beneath these objects via the openings that are covered thereby may bring about the release of the membrane portions that are associated with the openings on the point of being covered, the pressure in the film being substantially equal to $p_1$.

We claim:

1. A device for forming a layer of gaseous fluid on a surface to provide support for an object on said surface, which device comprises a casing defining a chamber, said casing having an inlet opening for connection to a source of said fluid under a given pressure and a fluid discharge opening to communicate with said surface, and a membrane stretched across said chamber between said inlet opening and said discharge opening, said membrane having edges fluidtightly mounted in said casing, said membrane being provided with fluid throughflow ports located remote from said discharge opening and fluid leakage means located opposite the discharge opening; said membrane being elastically deformable so as to come into close contact with at least the portion of the casing surrounding said discharge opening thereby to close the latter when a pressure difference occurs on opposite sides of the membrane, which is higher, by a given amount at least, than the static pressure difference, the spacing between the membrane, when in the nondeformed state, and the casing portion facing the membrane between the ports and the leakage means being such that, when the said object moves away from said discharge opening, fluid flow will occur from said ports to said discharge opening between said membrane and said casing portion, at a speed such that the dynamic depression created by said flow on the downstream side of the membrane, is at least equal to said given amount necessary for elastic deformation of said membrane into a position for closing said discharge opening, said leakage means being arranged to progressively raise the pressure on the downstream side of the membrane when an object to be supported appears opposite said discharge opening, through fluid flow through said leakage means, to return said membrane to its nondeformed state.

2. A device as claimed in claim 1, wherein the casing portion surrounding the discharge opening and facing the membrane has a concave configuration over its entire extent, and wherein the membrane is in contacting relationship along its entire circumference with the outer edge of said concave configuration.

3. A device as claimed in claim 1, wherein the casing portion surrounding the discharge opening and facing the membrane is flat over its entire extent, the membrane lying in parallel relationship with said casing portion, the distance between said ports and the edges of the membrane being greater than the distance between the edges of the membrane and said casing portion and is at least sufficient for said ports to be closed through contact of the membrane with said casing portion when the membrane is deformed into the position in which said discharge opening is closed.

4. A device as claimed in claim 1, wherein said leakage means comprises at least one passage traversing the membrane and having a cross section substantially less than that of said ports, in the portion thereof opposite the discharge opening.

5. A device as claimed in claim 1, wherein said leakage means comprises a porous structure in said portion of the membrane opposite the discharge opening.

6. A device as claimed in claim 4, wherein said casing is provided with a plurality of said discharge openings terminating in said surface at a corresponding plurality of spaced-apart locations, said membrane being uniform, said ports being offset in relation to said discharge openings, at least two of said ports being associat h each discharge opening.

7. A device as claimed in claim 6, wherein at least one said passage is in the membrane opposite each discharge opening.

8. A device as claimed in claim 6, which further comprises a flexible carrier belt having a run extending a short distance from said surface, and means for driving said belt, said belt serving to transport objects placed on the side thereof remote from said surface and becoming deformed towards said surface over those portions loaded with said objects, the arrangement being such that a layer of gaseous fluid comes to be formed beneath the loaded belt portions to provide support for said portions and the loads thereon, said layer moving underneath the belt in synchronism therewith.

9. A device as claimed in claim 6, wherein said casing includes a tubular portion defining on the outside thereof said support surface and adapted to have slidably mounted thereon an annular member having an inner diameter greater than the diameter of said surface, said membrane being of tubular shape and extending within said chamber, over the entire length thereof coaxially of said casing and at a short distance from the inside thereof, said membrane being fluidtightly secured to the ends of said casing.